US012563554B2

(12) United States Patent
Liang et al.

(10) Patent No.: US 12,563,554 B2
(45) Date of Patent: Feb. 24, 2026

(54) METHODS FOR COMMUNICATION, TERMINAL DEVICE, AND COMPUTER READABLE MEDIA

(71) Applicant: NEC CORPORATION, Tokyo (JP)

(72) Inventors: Lin Liang, Beijing (CN); Gang Wang, Beijing (CN)

(73) Assignee: NEC Corporation, Tokyo (JP)

( * ) Notice: Subject to any disclaimer, the term of this patent is extended or adjusted under 35 U.S.C. 154(b) by 279 days.

(21) Appl. No.: 18/028,869

(22) PCT Filed: Sep. 29, 2020

(86) PCT No.: PCT/CN2020/118969
§ 371 (c)(1),
(2) Date: Mar. 28, 2023

(87) PCT Pub. No.: WO2022/067541
PCT Pub. Date: Apr. 7, 2022

(65) Prior Publication Data
US 2023/0371025 A1      Nov. 16, 2023

(51) Int. Cl.
*H04W 72/20* (2023.01)
*H04W 72/1268* (2023.01)

(52) U.S. Cl.
CPC ....... *H04W 72/20* (2023.01); *H04W 72/1268* (2013.01)

(58) Field of Classification Search
CPC ........................... H04W 72/20; H04W 72/1268
See application file for complete search history.

(56) References Cited

U.S. PATENT DOCUMENTS

| 2019/0028162 A1 | 1/2019 | Lee et al. | |
| 2019/0373624 A1 | 12/2019 | Ye et al. | |
| 2021/0337562 A1* | 10/2021 | Huang | H04W 72/0446 |

FOREIGN PATENT DOCUMENTS

| CN | 107809801 A | 3/2018 |
| CN | 110719628 A | 1/2020 |

(Continued)

OTHER PUBLICATIONS

Qualcomm Incorporated. "Potential coverage enhancement techniques for PUSCH", 3GPP TSG-RAN WG1 Meeting #102, R1-2006820, Aug. 17-28, 2020, p. 9.

(Continued)

*Primary Examiner* — Brenda H Pham
(74) *Attorney, Agent, or Firm* — Sughrue Mion, PLLC

(57) ABSTRACT

Embodiments of the present disclosure relate to devices, methods, devices and computer readable storage media of resource allocation for coverage enhancement. The method comprises receiving, at a terminal device and from a network device, an indication of a resource allocation mode to perform an uplink data transmission, the resource allocation mode at least indicating resources allocated for the uplink data transmission being to be mapped on a plurality of slots, the plurality of slots comprising no symbols configured for downlink transmission; and transmitting the uplink data transmission based on the indication. In this way, the capability of coverage enhancement for the User Equipments (UEs) can be improved by scheduling the resources for the Physical Uplink Shared Channel (PUSCH) according to the approach of resource allocation of the present disclosure.

6 Claims, 4 Drawing Sheets

400

410
TRANSMIT INDICATION OF RESOURCE ALLOCATION MODE TO PERFORM UPLINK DATA TRANSMISSION

420
RECEIVE UPLINK DATA TRANSMISSION

(56)          References Cited

FOREIGN PATENT DOCUMENTS

| CN | 111436097 | A | 7/2020 |
| KR | 10-2019-0095328 | A | 8/2019 |
| WO | 2017/135745 | A1 | 8/2017 |
| WO | 2018/124702 | A1 | 7/2018 |
| WO | 2019/216729 | A1 | 11/2019 |
| WO | 2020/146854 | A1 | 7/2020 |

OTHER PUBLICATIONS

Moderator(China Telecom), "[102-e-NR-CovEnh-03] Email discussion/approval on PUSCH coverage enhancement", 3GPP TSG RAN WG1 e-Meeting #102-e, R1-20xxxxx, Aug. 17-28, 2020, p. 6.
NEC. "Discussion on PUSCH coverage enhancement", 3GPP TSG RAN WG1 #102-e, R1-2005758, Aug. 17-28, 2020, p. 3.
Interdigital Inc. "PUSCH coverage enhancement", 3GPP TSG RAN WG1 #102-e, R1-2006245, Aug. 17-28, 2020, p. 3.

International Search Report for PCT/CN2020/118969 dated Jun. 24, 2021.
Written Opinion for PCT/CN2020/118969 dated Jun. 24, 2021.
Chinese Office Communication for CN Application No. 202080105650.6, mailed on Jan. 23, 2025 with English Translation.
Lenovo, Motorola Mobility, "Remaining issues on UCI multiplexing on PUSCH", 3GPP TSG RAN WG1 Meeting #93 R1-1807604, May 25, 2018.
Extended European Search Report dated Oct. 10, 2023 in Application No. 20955566.3.
JP Office Action for JP Application No. 2023-519583, mailed on Mar. 26, 2024 with English Translation.
Nokia, Alcatel-Lucent Shanghai Bell, "Transport block size determination and the support of slot aggregation in NR", 3GPP TSG RAN WG1 Ad Hoc Meeting #2 R1-1710991, Jun. 17, 2017, pp. 1-pp. 3.
3GPP, "3GPP TS 38.212 V16.2.0 (Jun. 2020)", Jul. 20, 2020, pp. 1-pp. 151.

* cited by examiner

300

310

RECEIVE INDICATION OF RESOURCE ALLOCATION MODE TO PERFORM UPLINK DATA TRANSMISSION

320

TRANSMIT UPLINK DATA TRANSMISSION BASED ON INDICATION

400

410

TRANSMIT INDICATION OF RESOURCE ALLOCATION MODE TO PERFORM UPLINK DATA TRANSMISSION

420

RECEIVE UPLINK DATA TRANSMISSION

500

METHODS FOR COMMUNICATION, TERMINAL DEVICE, AND COMPUTER READABLE MEDIA

CROSS REFERENCE TO RELATED APPLICATIONS

This application is a National Stage of International Application No. PCT/CN2020/118969 filed Sep. 29, 2020.

FIELD

Embodiments of the present disclosure generally relate to the field of telecommunication and in particular, to devices, methods, devices and computer readable storage media of resource allocation for coverage enhancement.

BACKGROUND

The solution of resource allocation for Physical Uplink Shared Channel (PUSCH) of User Equipments (UEs) has been discussed for the coverage enhancement. In Long Term Evolution (LTE), an approach of sub-Physical Resource Block (sub-PRB) is adopted for coverage enhanced UE. Sub-PRB can give more transmission power of a UE because UE can accumulate power in time domain instead of in frequency domain.

SUMMARY

In general, example embodiments of the present disclosure provide a solution of resource allocation for coverage enhancement.

In a first aspect, there is provided a method for communications. The method comprises receiving, at a terminal device and from a network device, an indication of a resource allocation mode to perform an uplink data transmission, the resource allocation mode at least indicating resources allocated for the uplink data transmission mapped on a plurality of slots, the plurality of slots comprising no symbols configured for downlink transmission; and transmitting the uplink data transmission based on the indication.

In a second aspect, there is provided a method for communications. The method comprises transmitting, at a network device and to a terminal device, an indication of a resource allocation mode to perform an uplink data transmission, the resource allocation mode at least indicating the uplink data transmission mapped on a plurality of slots, the plurality of slots comprising no symbols configured for downlink transmission; and receiving the uplink data transmission based on the indication.

In a third aspect, there is provided a terminal device. The terminal device comprises a processor and a memory storing instructions. The memory and the instructions are configured, with the processor, to cause the terminal device to perform the method according to the first aspect.

In a fourth aspect, there is provided a network device. The network device comprises a processor and a memory storing instructions. The memory and the instructions are configured, with the processor, to cause the network device to perform the method according to the second aspect.

In a fifth aspect, there is provided a computer readable medium having instructions stored thereon. The instructions, when executed on at least one processor of a device, cause the device to perform the method according to the first aspect.

In a sixth aspect, there is provided a computer readable medium having instructions stored thereon. The instructions, when executed on at least one processor of a device, cause the device to perform the method according to the second aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the drawings, the same or similar reference numerals represent the same or similar element.

DETAILED DESCRIPTION

Figure 1:
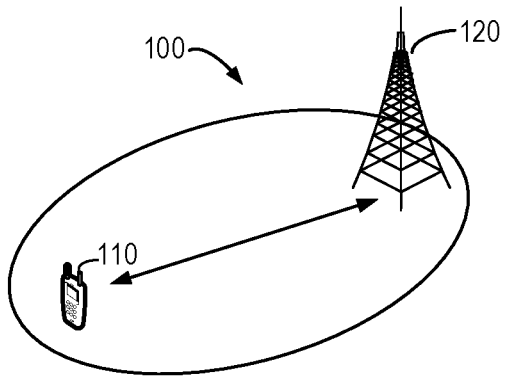
FIG. 1 illustrates an example environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish functionalities of various elements. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

FIG. 1 shows an example communication network 100 in which embodiments of the present disclosure can be implemented. The network 100 includes a terminal device 110 and a network device 120. Hereinafter, the terminal device 110 may also be referred to as a UE 110 and the network device 120 may be referred to a gNB 120. The terminal device 110 and the network device 120 may communicate with each other. It is to be understood that the number of terminal devices and network devices is only for the purpose of illustration without suggesting any limitations. The network 100 may include any suitable number of terminal devices and network devices adapted for implementing embodiments of the present disclosure.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

As mentioned above, the solution of resource allocation for Physical Uplink Shared Channel (PUSCH) of User Equipments (UEs) has been discussed for the coverage enhancement. Some approaches have been proposed for the PUSCH enhancements.

To deliver a packet to the gNB, the UE may be scheduled with higher Modulation and Coding Scheme (MCS) and less resource if channel condition is good or lower MCS and larger resource if the channel condition is bad. For UE at cell-edge, larger resource allocation does not seem to be an ideal option due to the limited power budget. Thus, cell-edge UEs are most likely to engage in narrow band transmissions with low MCS (QPSK and lower coding rate). Such a configuration can often require the UE to divide a higher-layer packet into multiple segments and transmit the packets over multiple small TBs in multiple UL grants. For example, if a UE has a packet with 1280 bits (e.g., a video call), the UE may transmit the packet in one slot using 16 RBs, or divide it into 4 parts each with 320 bits and transmit them in 4 slots using 4 RBs to have better coverage. It is to be understood that the latter option is clearly the better choice for a cell-edge UE. Thus, it has been proposed that a cell-edge UE is able to transmit a packet over multiple slots. That is, the UE may be scheduled to transmit a larger TBS using the REs across multiple slots.

Furthermore, in Long Term Evolution (LTE), an approach of sub-Physical Resource Block (sub-PRB) is adopted for coverage enhanced UE. Sub-PRB can give more transmission power of a UE because UE can accumulate power in time domain instead of in frequency domain. For example, 4 resource blocks (RBs) in frequency domain×1 slot in time domain has the same number of time-frequency resources elements in OFDM with 1 RB in frequency domain×4 slots in time domain. For another example, 1 RB in frequency domain×1 slot in time domain has the same number of time-frequency resources elements (TFRE) in OFDM with 0.25 RB in frequency domain×4 slots in time domain. Shifting the RE from frequency domain into time domain while keeping TFRE may provide more power and save CRC bits.

Resource units are used to describe the mapping of PUSCH using sub-PRB allocations to resource elements for BL/CE UEs. A resource unit is defined as $M_{symb}^{UL} M_{slots}^{UL}$ SC-FDMA symbols in the time domain and $M_{sc}^{RU}$ consecutive subcarriers in the frequency domain, where $M_{sc}^{RU}$ and $M_{symb}^{UL}$ are given by the Table shown as below.

perform the uplink data transmission based on the indication. In this way, the capability of coverage enhancement for the UEs can be improved by scheduling the resources for the PUSCH according to the approach of resource allocation of the present disclosure.

Figure 2:
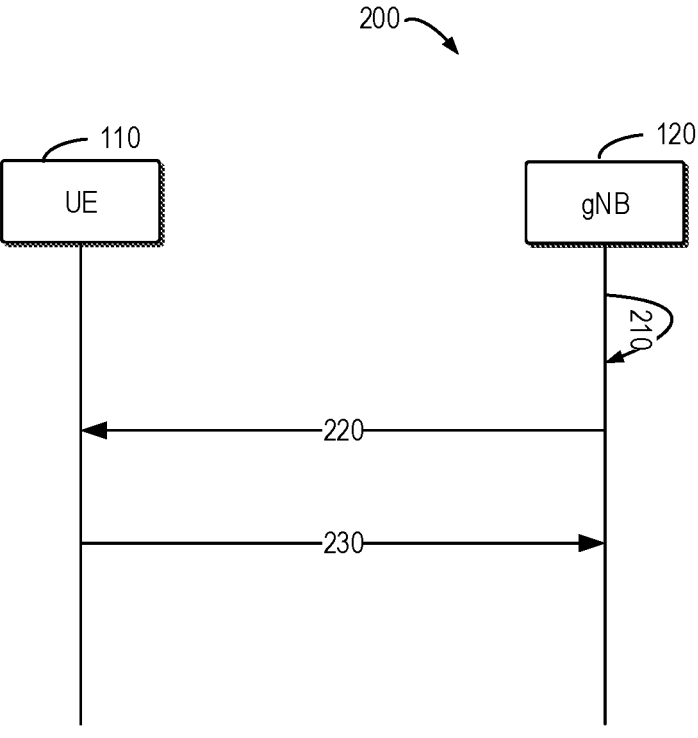
FIG. 2 shows a signaling chart illustrating a process of resource allocation for coverage enhancement according to some example embodiments of the present disclosure.

Principles and implementations of the present disclosure will be described in detail as below with reference to FIG. 2, which shows a schematic process of resource allocation for coverage enhancement. For the purpose of discussion, the process 200 will be described with reference to FIG. 1. The process 200 may involve the terminal device 110 and the network device 120 as illustrated in FIG. 1.

As shown in FIG. 1, the gNB 120 may generate 210 an indication of a resource allocation mode for UE 110 to perform an uplink data transmission. The resource allocation mode at least indicates the uplink data transmission mapped on a plurality of slots.

As an option, the resource allocation mode may be referred to as slot bundling mode. In the slot bundling mode, the resources allocated for the UE to transmit the transport block in the uplink data transmission can be mapped on a plurality of slots available for the uplink data transmission. For example, the plurality of slots may be a plurality of consecutive PUSCH slots. The PUSCH slots means any symbol in PUSCH is not indicated as DL based on the tdd-UL-DL-Configuration.

As another option, the resource allocation mode may also be referred to as sub-PRB mode, which may also be referred to as the sub-RB mode hereinafter. In the sub-RB mode, the resources used for the uplink data transmission may be configured with a set of sub-RB, which may be mapped on a plurality of slots available for the uplink data transmission. For example, the plurality of slots may be a plurality of consecutive PUSCH slots.

Then the gNB 120 may transmit 220 the indication of the resource allocation mode to the UE 110. In some example embodiments, the indication of slot bundling mode can be indicated to UE 110 statically by a Radio Resource Control (RRC) signaling or dynamically by Downlink Control Information (DCI).

In a case where the resource allocation mode refers to the slot bundling mode, the slot bundling mode can be configured, based on the indication, to the UE 110 with transport block scaling.

If slot bundling is configured, the mapping to resource elements $(k', l, n)_{p,\mu}$ allocated for PUSCH according to [6,

TABLE 1

Supported combinations of $M_{sc}^{RU}$, $M_{slots}^{UL}$, and $M_{symb}^{UL}$ for PUSCH using sub-PRB allocations for Frame Structure type 1 and Frame Structure type 2

| Physical channel | Δf | Modulation scheme | $M_{sc}^{UL}$ | $M_{sc}^{RU}$ | $M_{slots}^{UL}$ | $M_{symb}^{UL}$ | Comment |
|---|---|---|---|---|---|---|---|
| PUSCH | 15 kHz | π/2-BPSK | 12 | 3 | 16 | 7 | 2 out of 3 subcarriers used |
| | | QPSK | | 3 | 8 | | |
| | | | | 6 | 4 | | |

The present disclosure proposes a solution for resource selection of resource allocation for coverage enhancement. In this solution, the UE may receive, from a network device, an indication of a resource allocation mode to perform an uplink data transmission. The resource allocation mode may at least indicate resources allocated for the uplink data transmission is enabled to be mapped on a plurality of slots available for the uplink data transmission. Then the UE may TS 38.214] shall be in increasing order of first the index k' over the assigned virtual resource blocks, where k'=0 is the first subcarrier in the lowest-numbered virtual resource block assigned for transmission, and then the index l, with the starting position given by [6, TS 38.214], and then the index n where n=0 is the first slot in slot bundling.

In this case, the indication of slot bundling mode may comprise the number of the plurality of consecutive PUSCH slots, which may be referred as "G" hereinafter. In some example embodiments, the number of the plurality of slots "G" can be indicated in the bit field in the DCI or as a parameter in a RRC signaling.

The number of the plurality of slots "G" can also be indicated by combined encoding the number of the plurality of slots "G" with a Start and Length Indicator Value (SLIV) to get SLGIV, where SLGIV=SLIV+105*G.

The starting symbol S may be relative to the start of the slot, and the number of consecutive symbols L counting from the symbol S allocated for the PUSCH are determined from the start and length indicator SLIV of the indexed row: if (L−1)≤7 then SLIV=14·(L−1)+S, else SLIV=14·(14−L+1)+(14−1−S), where 0<L≤14−S.

Furthermore, the indication of slot bundling mode may also comprise a set of resource blocks allocated for transmitting the transport block in the uplink data transmission.

When TB size is calculated, the slot bundling size should be considered to get equivalent used RB. Equivalent RB is RB*G. Or When determine total number of RE, to accumulate number of RE in each slot in total.

The total number of REs allocated for PUSCH ($N_{RE}$) can be determined by $$N_{RE}=\min(156,N'_{RE})*n_{RB}*g \tag{1}$$

where $n_{PRB}$ is the total number of allocated PRBs for the UE and g is the slot bundling size when slot bundling is used.

The number of REs allocated for PUSCH within a PRB ($N'_{RE}$) can be determined by:

$$N'_{RE}=N_{SC}^{RB}\cdot N_{symb}^{sh}-N_{DMRS}^{PRB}-N_{oh}^{PRB} \tag{2}$$

where $N_{sc}^{RB}=12$ is the number of subcarriers in the frequency domain in a physical resource block, $N_{symb}^{sh}$ is the number of symbols L of the PUSCH allocation according to Clause 6.1.2.1 for scheduled PUSCH or Clause 6.1.2.3 for configured PUSCH, $N_{DMRS}^{PRB}$ is the number of REs for DM-RS per PRB in the allocated duration including the overhead of the DM-RS CDM groups without data, as described for PUSCH with a configured grant in Clause 6.1.2.3 or as indicated by DCI format 0_1 or DCI format 0_2 or as described for DCI format 0_0 in Clause 6.2.2, and $N_{oh}^{PRB}$ is the overhead configured by higher layer parameter xOverhead in PUSCH-ServingCellConfig. If the $N_{oh}^{PRB}$ is not configured (a value from 6, 12, or 18), the $N_{oh}^{PRB}$ is assumed to be 0. For Msg3 transmission the $N_{oh}^{PRB}$ is always set to 0. In case of PUSCH repetition Type B, $N_{DMRS}^{PRB}$ is determined assuming a nominal repetition with the duration of L symbols without segmentation.

In some example embodiments, the indication of slot bundling mode may also comprise a condition for triggering the resource allocation mode. The condition may be associated with the number of a set of RBs in the resources allocated for transmitting the transport block in the uplink data transmission. For example, it can be configured that the slot bundling mode may be triggered only when RB<=X, e.g. X=3. When allocated RB>X, legacy single slot mode is used. When allocated RB<=X, slot bundling mode is used if configured.

It can also be configured that the slot bundling mode may be triggered only when MCS<=X, e.g. X=3. When allocated MCS>X, legacy single slot mode is used. When allocated MCS<=X, slot bundling mode is used if configured.

It can also be configured that the slot bundling mode may be triggered only when L<=X, e.g. X=7. L is symbol length in a slot. When allocated L>X, legacy single slot mode is used. When allocated L>=X, slot bundling mode is used if configured.

In some example embodiments, the indication of slot bundling mode may also indicate how to map the resources allocated for the transport block in the uplink data transmission on the plurality of slots, when the Physical Uplink Control Channel (PUCCH) is overlapped with slot bundling transmission. For example, the Uplink Control Information (UCI) may multiplex with slot bundling PUSCH.

In some example embodiments, the UCI resources may puncture the PUSCH data resources, i.e. the PUSCH data mapping to the resource first and UCI will overwrite the data later. It will reduce the complexity for slot bundling processing by not considering UCI first.

In some example embodiments, when UCI multiplexes with TB, offset which is used to calculate the ratio of UCI to data is (beta_offset*G) where beta_offset is given by:

$$Q'_{ACK}=\min\left\{\left\lceil\frac{(O_{ACK}+L_{ACK})\cdot\beta_{offset}^{PUSCH}\cdot\sum_{l=0}^{N_{symb,all}^{PUSCH}-1}M_{sc}^{UCI}(l)}{\sum_{r=0}^{C_{UL-SCH}-1}K_r}\right\rceil,\right.$$

$$\left.\left\lceil\alpha\cdot\sum_{l=l_0}^{N_{symb,all}^{PUSCH}-1}M_{sc}^{UCI}(l)\right\rceil\right\} \tag{3}$$

where $O_{ACK}$ is the number of HARQ-ACK bits;

if $O_{ACK}\geq360$, $L_{ACK}=11$; otherwise $L_{ACK}$ is the number of CRC bits for HARQ-ACK determined according to Clause 6.3.1.2.1;

$\beta_{offset}^{PUSCH}=\beta_{offset}^{HARQ-ACK}$;

$C_{UL-SCH}$ is the number of code blocks for UL-SCH of the PUSCH transmission;

if the DCI format scheduling the PUSCH transmission includes a CBGTI field indicating that the UE shall not transmit the r-th code block, $K_r=0$; otherwise, $K_r$ is the r-th code block size for UL-SCH of the PUSCH transmission;

$M_{sc}^{PUSCH}$ is the scheduled bandwidth of the PUSCH transmission, expressed as a number of subcarriers;

$M_{sc}^{PT-RS}(l)$ is the number of subcarriers in OFDM symbol l that carries PTRS, in the PUSCH transmission;

$M_{sc}^{UCI}(l)$ is the number of resource elements that can be used for transmission of UCI in OFDM symbol l, for l=0, 1, 2, . . . , $N_{symball}^{PUSCH}-1$, in the PUSCH transmission and $N_{symball}^{PUSCH}$ is the total number of OFDM symbols of the PUSCH, including all OFDM symbols used for DMRS;

for any OFDM symbol that carries DMRS of the PUSCH, $M_{sc}^{UCI}(l)=0$;

for any OFDM symbol that does not carry DMRS of the PUSCH, $M_{sc}^{UCI}(l)=M_{sc}^{PUSCH}-M_{sc}^{PT-RS}(l)$;

$\alpha$ is configured by higher layer parameter scaling;

$l_0$ is the symbol index of the first OFDM symbol that does not carry DMRS of the PUSCH, after the first DMRS symbol(s), in the PUSCH transmission.

In some example embodiments, in a case where the resource allocation mode refers to sub-RB mode, the resources allocated for the UE 110 to perform the uplink data transmission may be configured with a set of sub-RBs.

In this case, the indication of resource allocation mode may comprise configuration information for at least one resource unit associated with the set of RBs. For example, the configuration information may comprise subcarrier length of a sub-RB and slot length of a sub-RB to generate a resource unit.

In some example embodiments, multiple resource units can be configured by RRC signaling and the target resource unit to be used in the uplink data transmission can be dynamic indicated in DCI by grant scheduling. For example, the index of the target resource unit can be indicated by the DCI.

In some example embodiments, the indication of resource allocation mode may also comprise an allocation of the set of RBs in a time domain and a frequency domain.

For the frequency domain, only a set of RBs among all RB in Band Width Part (BWP) for sub-RB purpose can be configured, for example, by a RRC signaling. For example, the set of RBs can be represented by $[\log_2(N_{RU}^{DL,BWP})]$ bits, $N_{RU}^{DL,BWP}$ is the number of Configured Resource Units. If bit field equal to k, the (k+1)-th RU is indicated to UE.

For the time domain, the number of consecutive PUSCH slot "K" which is not indicated as DL based on the tdd-UL-DL-Configuration can be configured as the resources for sub-RB transmission.

Furthermore, the indication of resource allocation mode may also comprise a condition for triggering the sub-RB mode. For example, RRC can configure the indication of dynamic switching between sub-RB resource allocation and legacy resource allocation, e.g. by a 1-bit field indication.

Furthermore, the indication of resource allocation mode may also comprise MCS calculation configured for the set of RBs. The total number of REs allocated for PUSCH ($N_{RE}$) can be determined by:

$$N_{RE}=\min(156,N'_{RE})\cdot n_{PRB} \qquad (4)$$

where $n_{PRB}$ is the total number of allocated PRBs for the UE or $n_{RB}=N_{sc}^{RU}N_{slot}^{RU}/N_{sc}^{RB}$ for sub-PRB allocation.

Alternatively, the indication of resource allocation mode may also comprise a power control pattern configured for the set of RBs. For the sub-PRB power control, the RB number should be 1 instead of (e.g.) 0.25 to get Power. As M=0.25 will not increase power compared to full-RB allocation.

If a UE transmits a PUSCH on active UL BWP b of carrier f of serving cell c using parameter set configuration with index j and PUSCH power control adjustment state with index l, the UE determines the PUSCH transmission power $P_{PUSCH,b,f,c}(i,j,q_d,l)$ in PUSCH transmission occasion i as $$(5)$$

$$P_{PUSCH,b,f,c}(i, j, q_d, l) =$$

$$\min\left\{ \begin{array}{l} P_{CMAX,f,c}(i), \\ P_{O\_PUSCH,b,f,c}(j) + 10\log_{10}\left(2^{\mu} \cdot M_{RB,b,f,c}^{PUSCH}(i)\right) + \\ \alpha_{b,f,c}(j) \cdot PL_{b,f,c}(q_d) + \Delta_{TF,b,f,c}(i) + f_{b,f,c}(i, l) \end{array} \right\} [\text{dBm}]$$

where $M_{RB,b,f,c}^{PUSCH}(i)$ is the bandwidth of the PUSCH resource assignment expressed in number of resource blocks for PUSCH transmission occasion i on active UL BWP b of carrier f of serving cell c and μ is a SCS configuration defined in [4, TS 38.211]. $M_{RB,b,f,c}^{PUSCH}(i)=1$ for sub-RB allocation.

Alternatively, the indication of resource allocation mode may also comprise a transmission pattern of Demodulation Reference Signal (DMRS) associated with the set of RBs. As an option, the sub-RB frequency resource allocation is only for PUSCH data. The DMRS for sub-RB mode is the full RB DMRS where the sub-RB located in, i.e. DMRS bandwidth>PUSCH bandwidth. As another option, only DMRS sequence generation when transform precoding is disabled is used. Only the DMRS in frequency domain overlapped with sub-RB frequency resources can be used, i.e. DMRS bandwidth<=PUSCH bandwidth.

Referring back to FIG. 2, the UE 110 may transmit 230 the uplink data transmission based on the indication of resource allocation mode to the gNB 120.

By different resource allocation modes proposed in the present disclosure, the capability of coverage enhancement for the UEs can be improved.

Figure 3:
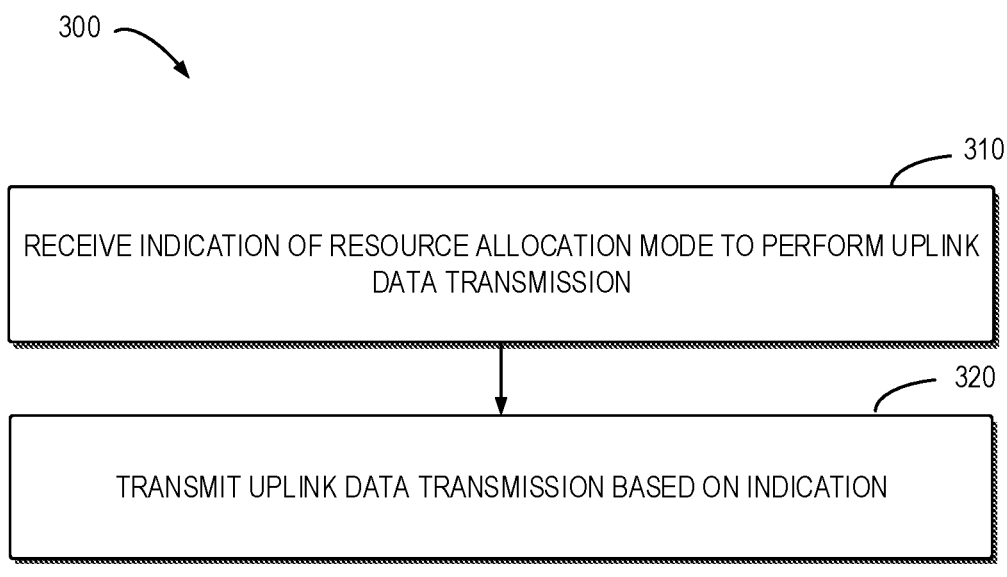
FIG. 3 shows flowchart of an example method of resource allocation for coverage enhancement according to some example embodiments of the present disclosure.

FIG. 3 shows a flowchart of an example method 300 of resource allocation for coverage enhancement according to some example embodiments of the present disclosure. The method 300 can be implemented at the terminal device 110 as shown in FIG. 1. For the purpose of discussion, the method 300 will be described with reference to FIG. 1.

At 310, the terminal device receives, from a network device, an indication of a resource allocation mode to perform an uplink data transmission. The resource allocation mode at least indicates the uplink data transmission mapped on a plurality of slots and the plurality of slots comprises no symbols configured for downlink transmission.

In some example embodiments, the terminal device may receive the indication via a RRC or DCI.

At 320, the terminal device transmits the uplink data transmission based on the indication.

In some example embodiments, the terminal device may obtain, from the indication, a set of parameters associated with the resource allocation mode comprising at least one of the following: a number of the plurality of slots; a condition for triggering the resource allocation mode; and an usage mode for transmitting uplink control information with the uplink data transmission.

In some example embodiments, the number of the plurality of slots is indicated by one of the following: a bit field in downlink control information; a parameter in a radio resource control signaling; or a combined encoding with a start and length indicator value indicating symbols of the plurality of slots allocated for the uplink data transmission.

In some example embodiments, the condition for triggering the resource allocation mode is associated with at least one of the following: a modulation and coding scheme configured for the uplink data transmission; and a symbol length of a slot in the plurality of slots.

In some example embodiments, the usage mode indicates one of the following: the uplink data transmission is multiplexed with the uplink control information; and the uplink data transmission is overwritten by the uplink control information.

In some example embodiments, the resource allocation mode indicates a set of subcarriers in a resource block for the uplink data transmission In some example embodiments, the terminal device may obtain, from the indication, a set of parameters associated with the resource allocation mode comprising at least one of the following: configuration information for at least one resource unit associated with at least one of a set of subcarriers; an allocation of the set of resource blocks associated with the resource unit in time domain and frequency domain; a condition for triggering the resource allocation mode; a power control pattern configured for the set of resource blocks; a modulation and coding scheme configured for the set of resource blocks; and a transmission pattern of a Demodulation Reference Signal associated with the set of resource blocks.

In some example embodiments, the configuration information for the resource unit comprises: subcarrier length of a resource block in the set of resource blocks, the number of the at least one resource unit; and an index of a resource unit in the at least one resource unit available for the uplink data transmission.

Figure 4:
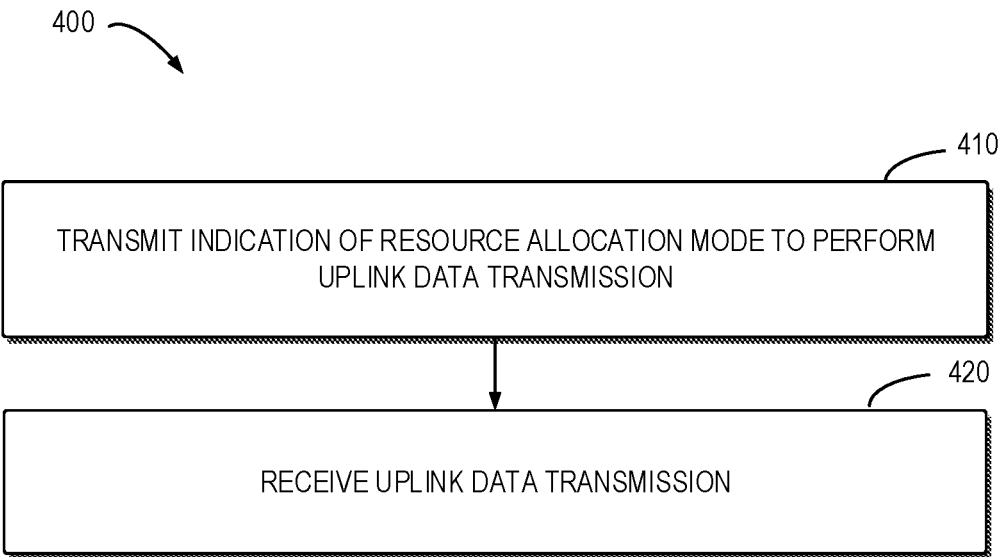
FIG. 4 shows flowchart of an example method of resource allocation for coverage enhancement according to some example embodiments of the present disclosure.

FIG. 4 shows a flowchart of an example method 400 of resource allocation for coverage enhancement according to some example embodiments of the present disclosure. The method 300 can be implemented at the network device 120 as shown in FIG. 1. For the purpose of discussion, the method 400 will be described with reference to FIG. 1.

At 410, the network device transmits an indication of a resource allocation mode to perform an uplink data transmission. The resource allocation mode at least indicates the uplink data transmission mapped on a plurality of slots and the plurality of slots comprises no symbols configured for downlink transmission.

In some example embodiments, the network device may transmit the indication via a RRC or DCI.

In some example embodiments, the network device may transmit a set of parameters associated with the resource allocation mode comprising at least one of the following: a number of the plurality of slots; a condition for triggering the resource allocation mode; and an usage mode for transmitting uplink control information with the uplink data transmission.

In some example embodiments, the number of the plurality of slots is indicated by one of the following: a bit field in downlink control information; a parameter in a radio resource control signaling; or a combined encoding with a start and length indicator value indicating symbols of the plurality of slots allocated for the uplink data transmission.

In some example embodiments, the condition for triggering the resource allocation mode is associated with at least one of the following: a modulation and coding scheme configured for the uplink data transmission; and a symbol length of a slot in the plurality of slots.

In some example embodiments, the usage mode indicates one of the following: the uplink data transmission is multiplexed with the uplink control information; and the uplink data transmission is overwritten by the uplink control information.

In some example embodiments, the network device may transmit a set of parameters associated with the resource allocation mode comprising at least one of the following: configuration information for at least one resource unit associated with at least one of a set of subcarriers; an allocation of the set of resource blocks associated with the resource unit in time domain and frequency domain; a condition for triggering the resource allocation mode; a power control pattern configured for the set of resource blocks; a modulation and coding scheme configured for the set of resource blocks; and a transmission pattern of a Demodulation Reference Signal associated with the set of resource blocks.

In some example embodiments, the configuration information for the resource unit comprises: subcarrier length of a resource block in the set of resource blocks, the number of the at least one resource unit; and an index of a resource unit in the at least one resource unit available for the uplink data transmission.

At 420, the network device receives the uplink data transmission based on the indication.

Figure 5:
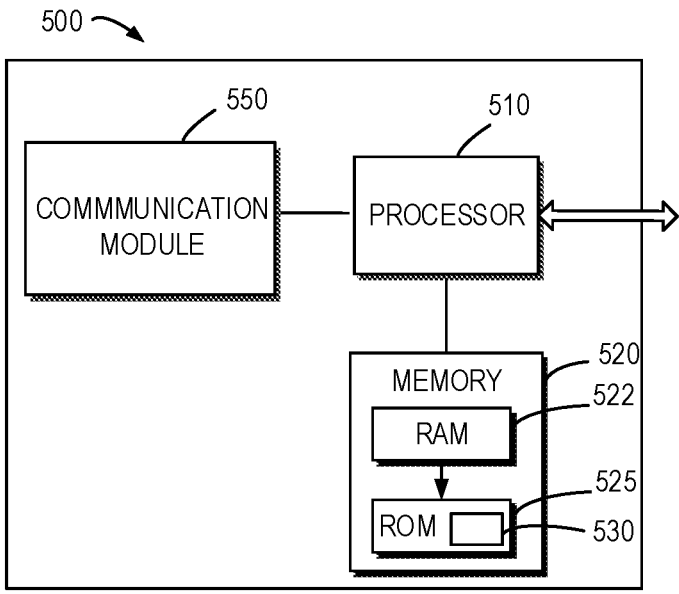
FIG. 5 shows a simplified block diagram of a device that is suitable for implementing example embodiments of the present disclosure.

FIG. 5 is a simplified block diagram of a device 500 that is suitable for implementing embodiments of the present disclosure. The device 500 may be provided to implement the communication device, for example the terminal device 110 and the network device 120 as shown in FIG. 1. As shown, the device 500 includes one or more processors 510, one or more memories 540 coupled to the processor 510, and one or more transmitters and/or receivers (TX/RX) 540 coupled to the processor 510.

The TX/RX 540 is for bidirectional communications. The TX/RX 540 has at least one antenna to facilitate communication. The communication interface may represent any interface that is necessary for communication with other network elements.

The processor 510 may be of any type suitable to the local technical network and may include one or more of the following: general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

The memory 520 may include one or more non-volatile memories and one or more volatile memories. Examples of the non-volatile memories include, but are not limited to, a Read Only Memory (ROM) 524, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 522 and other volatile memories that will not last in the power-down duration.

A computer program 530 includes computer executable instructions that are executed by the associated processor 510. The program 530 may be stored in the ROM 520. The processor 510 may perform any suitable actions and processing by loading the program 530 into the RAM 520.

The embodiments of the present disclosure may be implemented by means of the program 530 so that the device 500 may perform any process of the disclosure as discussed with reference to FIGS. 2 to 4. The embodiments of the present disclosure may also be implemented by hardware or by a combination of software and hardware.

In some embodiments, the program 530 may be tangibly contained in a computer readable medium which may be included in the device 500 (such as in the memory 520) or other storage devices that are accessible by the device 500. The device 500 may load the program 530 from the computer readable medium to the RAM 522 for execution. The computer readable medium may include any types of tangible non-volatile storage, such as ROM, EPROM, a flash memory, a hard disk, CD, DVD, and the like.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, device, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 300 and 400 as described above with reference to FIGS. 3-4. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing device, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, device or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, device, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method performed by a terminal device, the method comprising:

receiving downlink control information (DCI) comprising a value, wherein the value corresponds to number of slots allocated for transport block processing for physical uplink shared channel (PUSCH); and transmitting a hybrid automatic repeat request-acknowledgement (HARQ-ACK) on the PUSCH based on the number of slots, wherein transmitting the HARQ-ACK on the PUSCH is based on following equation:

$$Q'_{ACK} = \min\left\{ \lceil Z \rceil, \left\lceil \alpha \cdot \sum_{l=l_0}^{N^{PUSCH}_{symb,all}-1} M^{UCI}_{sc}(l) \right\rceil \right\},$$

wherein Z is obtained by multiplying the number of slots with $$\frac{(O_{ACK}+L_{ACK}) \cdot \beta^{PUSCH}_{offset} \cdot \sum_{l=0}^{N^{PUSCH}_{symb,all}-1} M^{UCI}_{sc}(l)}{\sum_{r=0}^{C_{UL-SCH}-1} K_r},$$

where:

$O_{ACK}$ is number of HARQ-ACK bits;

if $O_{ACK} \geq 360$, $L_{ACK}=11$; otherwise $L_{ACK}$ is number of cyclic redundancy check (CRC) bits for HARQ-ACK;

$\beta_{offset}^{PUSCH}=\beta_{offset}^{HARQ-ACK}$, and represents an offset value;

$C_{UL-SCH}$ is number of code blocks for uplink-shared channel (UL-SCH) of PUSCH transmission;

if downlink control information (DCI) format scheduling the PUSCH transmission includes a code block group transmission information (CBGTI) field indicating that the terminal device shall not r-th code block, $K_r=0$; otherwise, $K_r$ is r-th code block size for UL-SCH of the PUSCH transmission;

$M_{sc}^{PUSCH}$ is scheduled bandwidth of the PUSCH transmission, expressed as a number of subcarriers;

$M_{sc}^{PT-RS}(l)$ is number of subcarriers in OFDM symbol l that carries phase tracking reference signals (PTRS), in the PUSCH transmission;

$M_{sc}^{UCI}(l)$ is number of resource elements that can be used for transmission of UCI in orthogonal frequency division multiplexing (OFDM) symbol l, for l=0, 1, 2, . . . , $N_{symball}^{PUSCH}-1$, in the PUSCH transmission and $N_{symball}^{PUSCH}$ is total number of OFDM symbols of the PUSCH, including all OFDM symbols used for demodulation reference signal (DMRS);

for any OFDM symbol that carries DMRS of the PUSCH, $M_{sc}^{UCI}(l)=0$;

for any OFDM symbol that does not carry DMRS of the PUSCH, $M_{sc}{}^{UCI}(l)=M_{sc}{}^{PUSCH}-M_{sc}{}^{PT-RS}(l)$;

$\alpha$ is configured by higher layer parameter scaling; and $l_0$ is symbol index of first OFDM symbol that does not carry DMRS of the PUSCH, after the first DMRS symbol(s), in the PUSCH transmission.

2. The method of claim 1, further comprising:

determining transport block size by determining total number of resource elements (REs) allocated for the PUSCH based on the number of slots.

3. A method performed by a network device, the method comprising:

transmitting downlink control information (DCI) comprising a value, wherein the value corresponds to number of slots allocated for transport block processing for physical uplink shared channel (PUSCH); and receiving a hybrid automatic repeat request-acknowledgement (HARQ-ACK) on the PUSCH based on the number of slots, wherein receiving the HARQ-ACK on the PUSCH based on following equation:

$$Q'_{ACK} = \min\left\{ \lceil Z \rceil, \left\lceil \alpha \cdot \sum_{l=l_0}^{N_{symb,all}^{PUSCH}-1} M_{sc}^{UCI}(l) \right\rceil \right\},$$

wherein Z is obtained by multiplying the number of slots with $$\frac{(O_{ACK}+L_{ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r},$$

where:

$O_{ACK}$ is number of HARQ-ACK bits;

if $O_{ACK} \geq 360$, $L_{ACK}=11$; otherwise $L_{ACK}$ is number of cyclic redundancy check (CRC) bits for HARQ-ACK;

$\beta_{offset}^{PUSCH}=\beta_{offset}^{HARQ-ACK}$, and represents an offset value;

$C_{UL-SCH}$ is number of code blocks for uplink-shared channel (UL-SCH) of PUSCH transmission;

if downlink control information (DCI) format scheduling the PUSCH transmission includes a code block group transmission information (CBGTI) field indicating that the terminal device shall not transmit r-th code block, $K_r=0$; otherwise, $K_r$ is r-th code block size for UL-SCH of the PUSCH transmission;

$M_{sc}{}^{PUSCH}$ is scheduled bandwidth of the PUSCH transmission, expressed as a number of subcarriers;

$M_{sc}{}^{PT-RS}(l)$ is number of subcarriers in OFDM symbol l that carries phase tracking reference signals (PTRS), in the PUSCH transmission;

$M_{sc}{}^{UCI}(l)$ is number of resource elements that can be used for transmission of UCI in orthogonal frequency division multiplexing (OFDM) symbol l, for l=0, 1, 2, . . . , $N_{symball}{}^{PUSCH}-1$, in the PUSCH transmission and $N_{symball}{}^{PUSCH}$ is total number of OFDM symbols of the PUSCH, including all OFDM symbols used for demodulation reference signal (DMRS);

for any OFDM symbol that carries DMRS of the PUSCH, $M_{sc}{}^{UCI}(l)=0$;

for any OFDM symbol that does not carry DMRS of the PUSCH, $M_{sc}{}^{UCI}(l)=M_{sc}{}^{PUSCH}-M_{sc}{}^{PT-RS}(l)$;

$\alpha$ is configured by higher layer parameter scaling; and $l_0$ is symbol index of first OFDM symbol that does not carry DMRS of the PUSCH, after the first DMRS symbol(s), in the PUSCH transmission.

4. The method of claim 3, further comprising:

determining transport block size by determining total number of resource elements (REs) allocated for the PUSCH based on the number of slots.

5. A terminal device comprising a processor configured to cause the terminal device to:

receive downlink control information (DCI) comprising a value, wherein the value corresponds to number of slots allocated for transport block processing for physical uplink shared channel (PUSCH); and transmit a hybrid automatic request-acknowledgement (HARQ-ACK) on the PUSCH based on the number of slots, wherein the terminal device is caused to transmit the HARQ-ACK on the PUSCH based on following equation:

$$Q'_{ACK} = \min\left\{ \lceil Z \rceil, \left\lceil \alpha \cdot \sum_{l=l_0}^{N_{symb,all}^{PUSCH}-1} M_{sc}^{UCI}(l) \right\rceil \right\},$$

wherein Z is obtained by multiplying the number with $$\frac{(O_{ACK}+L_{ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r},$$

where:

$O_{ACK}$ is number of HARQ-ACK bits;

if $O_{ACK} \geq 360$, $L_{ACK}=11$; otherwise $L_{ACK}$ is number of cyclic redundancy check (CRC) bits for HARQ-ACK;

$\beta_{offset}^{PUSCH}=\beta_{offset}^{HARQ-ACK}$, and represents an offset value;

$C_{UL-SCH}$ is number of code blocks for uplink-shared channel (UL-SCH) of PUSCH transmission;

if downlink control information (DCI) format scheduling the PUSCH transmission includes a code block group transmission information (CBGTI) field indicating that the terminal device shall not transmit r-th code block, $K_r=0$; otherwise, $K_r$ is r-th code block size for UL-SCH of the PUSCH transmission;

$M_{sc}{}^{PUSCH}$ is scheduled bandwidth of the PUSCH transmission, expressed as a number of subcarriers;

$M_{sc}{}^{PT-RS}(l)$ is number of subcarriers in OFDM symbol l that carries phase tracking reference signals (PTRS), in the PUSCH transmission;

$M_{sc}{}^{UCI}(l)$ is number of resource elements that can be used for transmission of UCI in orthogonal frequency division multiplexing (OFDM) symbol l, for l=0, 1, 2, . . . . . $N_{symball}{}^{PUSCH}-1$, in the PUSCH transmission and $N_{symball}{}^{PUSCH}$ is total number of OFDM symbols of the PUSCH, including all OFDM symbols used for demodulation reference signal (DMRS);

for any OFDM symbol that carries DMRS of the PUSCH, $M_{sc}{}^{UCI}(l)=0$;

for any OFDM symbol that does not carry DMRS of the PUSCH, $M_{sc}{}^{UCI}(l)=M_{sc}{}^{PUSCH}-M_{sc}{}^{PT-RS}(l)$;

$\alpha$ is configured by higher layer parameter scaling; and $l_0$ is symbol index of first OFDM symbol that does not carry DMRS of the PUSCH, after the first DMRS symbol(s), in the PUSCH transmission.

6. The terminal device of claim 5, wherein the processor is further configured to:

determine transport block size by determining total number of resource elements (REs) allocated for the PUSCH based on the number of slots.

\* \* \* \* \*